United States Patent [19]
Vodon

[11] Patent Number: 5,913,805
[45] Date of Patent: Jun. 22, 1999

[54] TRASH BAFFLE FOR ROUND BALER APPARATUS

[75] Inventor: Lionel A. Vodon, Balgonie, Canada

[73] Assignee: New Holland North America, Inc., New Holland, Pa.

[21] Appl. No.: 08/893,809

[22] Filed: Jul. 11, 1997

[51] Int. Cl.⁶ ............................................. A01F 15/07
[52] U.S. Cl. ................................................ 56/341; 100/88
[58] Field of Search ........................ 56/341, 343; 100/88, 100/89

[56] References Cited

U.S. PATENT DOCUMENTS

| | | | |
|---|---|---|---|
| 4,399,746 | 8/1983 | Viaud | 100/88 |
| 4,581,879 | 4/1986 | Anstey | 56/341 |
| 4,707,974 | 11/1987 | Harthoorn | 56/341 |
| 4,870,812 | 10/1989 | Jennings | 56/341 |
| 5,070,780 | 12/1991 | Viaud et al. | 56/341 X |
| 5,080,009 | 1/1992 | Fritz et al. | 100/88 |
| 5,097,760 | 3/1992 | Ratzlaff et al. | 100/88 |
| 5,191,833 | 3/1993 | Clevenger, Jr. | 100/88 |
| 5,315,925 | 5/1994 | Viaud et al. | 56/341 X |
| 5,408,925 | 4/1995 | McClure et al. | 100/88 |

*Primary Examiner*—Terry Lee Melius
*Attorney, Agent, or Firm*—Frank A. Seemar; Larry W. Miller; J. William Stader

[57] ABSTRACT

A round baler having a main frame, a tailgate pivotally connected to the main frame and an apron extending around a plurality of guide rolls disposed in the main frame and the tailgate. A pair of take up arms, rotatably mounted on the main frame, carry at least one additional guide roll for the apron. A bale forming chamber, including the apron, varies in size from a bale starting position to a full bale position. A trash baffle is provided for preventing trash from entering the area between the belts and one or more of the rolls as the bale is being formed in the bale forming chamber. An auxiliary trash baffle is also provided for preventing trash from entering the area between the belts and one or more of the rolls under conditions where the belts are moving in the direction opposite to the direction of travel during bale formation.

13 Claims, 7 Drawing Sheets

TRASH BAFFLE FOR ROUND BALER APPARATUS

FIELD OF THE INVENTION

The present invention relates generally to round balers and more particularly to an improved trash baffle assembly for preventing the accumulation of trash and unwanted debris between the forming belts and transverse rollers used in the formation of bales.

BACKGROUND OF THE INVENTION

Agricultural machines towed by a tractor across a field for picking up windrowed crop material to form a cylindrical bale are commonly referred to as round balers. These machines have either a fixed or an expandable bale forming chamber defined in part by opposing vertical sidewalls. The chamber is further defined by a floor and transverse confining means comprising a continuous flexible apron and/or a plurality of transverse rolls. Frequently the apron includes an array of side-by-side belts trained around a series of rollers that extend between the sidewalls, and the floor consists of either a large roller or a continuous conveyor belt.

During field operation, crop material such as hay is picked up from the ground and fed into the chamber. The volume of crop material increases continuously in the chamber until a compact cylindrical package is formed. The package is wrapped while still in the chamber and then ejected onto the ground as a completed bale.

Round balers of the general type mentioned above comprising a chamber defined at least partially by a plurality of longitudinally extending belts supported on a series of transverse rollers have encountered problems of varying degree caused by build-up of trash on the rolls. It is not uncommon for random debris from crop material that is being formed in the chamber to pass through the spaces between the belts and becomes entrapped in the area adjacent the guide rolls or drive rolls around which the belts are traveling during operation of the baler. When the crop material being baled is damp, and particularly if it is a short cut of grass crop, an unwanted build-up of debris tends to form on the roll which is detrimental to proper belt tracking on the rollers. Eventually, if permitted to go uncorrected, various problems may occur, not the least significant of which is poor tracking which eventually can lead to binding of the belts and even eventual belt deterioration and breakage.

A number of prior art solutions to reduce or overcome these problems have been proposed. For example, U.S. Pat. No. 4,581,879, issued in the name of H. D. Anstey on Apr. 15, 1986 discloses an anti-wrap attachment for round balers directed to the avoidance of stray hay wrapping around the ends of a roll in the area of the bearings. Anstey shows a spiral element welded on a roll in combination with a scraper mounted with its edge in the vicinity of the roller to remove crop debris being carried around the surface of the roll. Scraping devices in combination with round baler rollers are also shown in various other prior art balers, e.g., U.S. Pat. No. 5,191,833, issued in the name of James T. Clevenger et al on Mar. 9, 1994, shows a stripper cooperating with a unique rigid loop structure for preventing crop debris build-up on a roller in a round baler. U.S. Pat. No. 5,408,925, issued in the name of John R. McClure et al on Apr. 25, 1995, is another example of a round baler in which apparatus is employed to discourage the build-up of unwanted trash accumulation in the vicinity of the rollers used during the formation of hay into a cylindrical bale.

Another prior art approach is the use of varying belt arrays to reduce the accumulation of unwanted debris between the belts and rollers of round balers. For example, in U.S. Pat. No. 4,707,974, issued Nov. 24, 1987 in the name of Carroll L. Harthoorn a baler using belts and rollers to form round bales shows preselected belt sections provided with a twist. In another example of prior art structure of this type, U.S. Pat. No. 4,399,746, issued Aug. 23, 1983 in the name of Jean Viaud shows a round baler in which the belts are staggered in a manner that provides openings between adjacent belts.

Various mechanisms disposed in the area where the unwanted debris accumulates have also been adapted to prior art round balers. To this end U.S. Pat. No. 5,080,009, issued Jan. 14, 1992 in the name of David P. Fritz et al, shows a mechanism for sweeping unwanted debris transversely toward an opening in the baler side wall, and U.S. Pat. No. 5,097,760, issued Mar. 24, 1992 in the name of Howard J. Ratzlaff et al shows a series of rotary elements projecting into the spaces between adjacent belts.

Although prior art arrangements for removing unwanted debris have met with varying degrees of success, there are still various crop conditions and round baler arrangements where problems caused by trash accumulation affects the overall performance. For example, in round balers having a chamber formed in part by a plurality of rollers mounted on a pivoting sledge, the limit chain for the sledge has been damaged when debris builds up between the belts and a roll controlling the position of the sledge. Thus, prevention of trash build-up without requiring elaborate modification to existing structure are interrelated aspects of reliable round baler performance to which the present invention is devoted, regardless of the chamber forming elements of the baler, or the type of crop conditions in which they operate.

SUMMARY OF THE INVENTION

An important object of the present invention is to provide improved apparatus for reducing the accumulation of debris in the vicinity of the forming belts and adjacent transverse rollers of a round baler, such roller being operatively mounted to accommodate belts trained therearound during operation. The present invention enhances the durability and reliability of round balers and thereby improves overall performance by reducing or eliminating the incidence of failure caused by the presence of unwanted trash between the belts and rollers.

In pursuance of this and other important objects the present invention provides improvements in a round baler having a main frame, a tailgate pivotally connected to the main frame, and a bale forming assembly mounted on the main frame for movement between a bale starting position and a full bale position. The bale forming assembly comprises conveying means having a crop engaging surface extending transversely of the main frame. The baler also has an apron movably supported along a continuous path on the main frame and on the tailgate, the apron path having an inner course with a surface that cooperates with the conveying means on the bale forming assembly to define a bale forming chamber, and a pickup for feeding crop material into the bale forming chamber. The bale forming assembly further comprises a roller extending transversely of the main frame for operative engagement with the opposite surface of said apron. More specifically, it is contemplated that the improved baler includes baffle means mounted on the bale forming assembly, the baffle means being disposed adjacent the opposite surface of the apron for shielding the roll from stray crop material and other debris under conditions where the apron is moving in a direction opposite to the bale forming direction.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
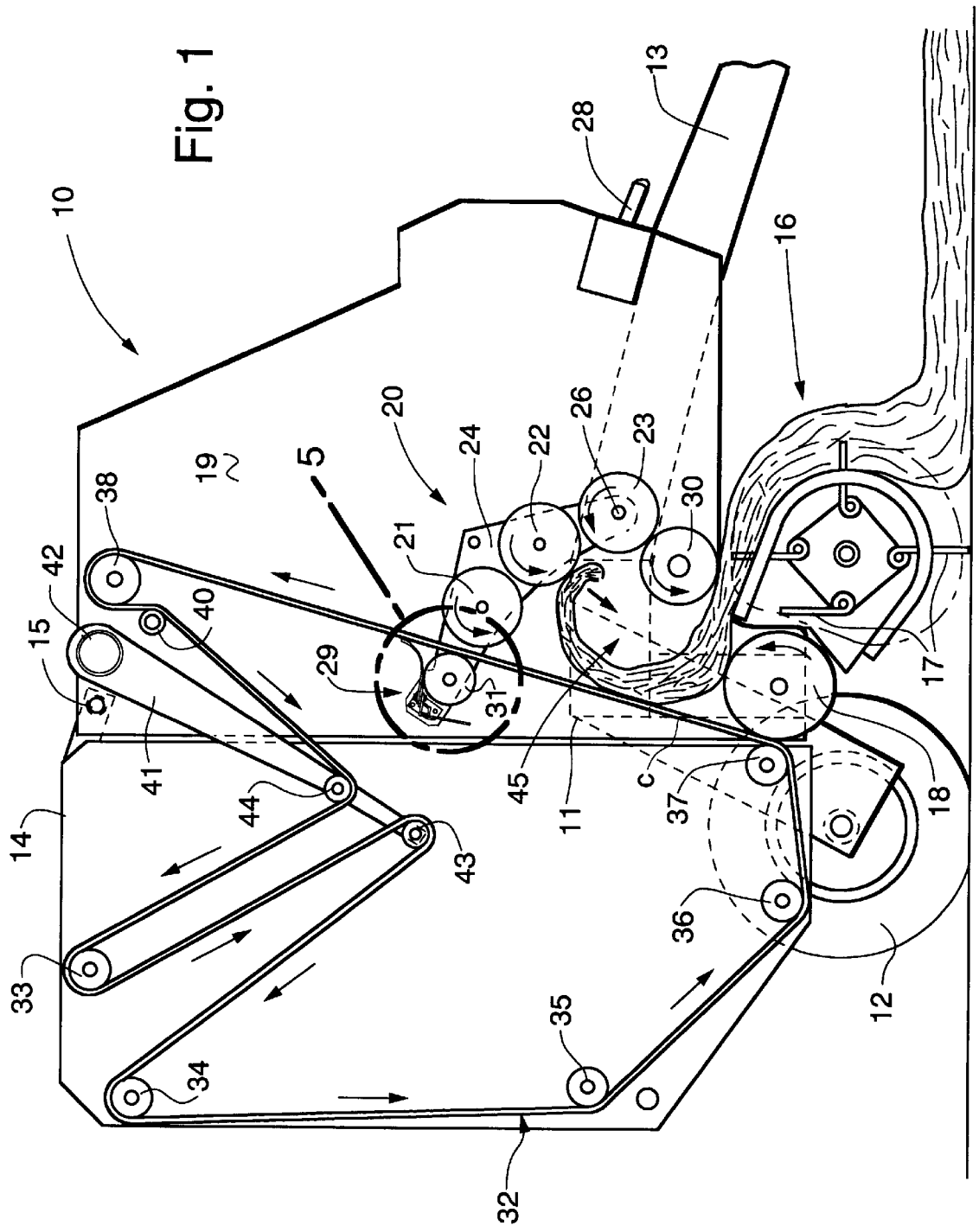
FIG. 1 is a diagrammatic side elevational view of a round baler in which the present invention is embodied.

Referring to the drawings for a detailed description of the preferred embodiment of the invention, FIG. 1 shows a round baler 10 of the type having an expandable chamber defined in part by belts and rollers, as disclosed in U.S. Pat. No. 4,870,812, issued Oct. 12, 1989 in the name of Richard E. Jennings, et al, in which the preferred embodiment of the present invention is readily incorporated. Baler 10 has a main frame 11, including a pair of side walls, supported by a pair of wheels 12 (only one shown). A forwardly mounted tongue 13 is provided on main frame 11 for connection to a tractor. Pivotally connected to opposing side walls 19 (only one shown) by a pair of stub shafts 15 is a tailgate 14 which is closed during bale formation. A pickup 16, mounted on main frame 11, includes a plurality of tines 17 movable in a predetermined path to lift crop material from the ground and deliver it rearwardly toward a floor roll 18, rotatably mounted on main frame 11.

A chamber for forming bales is defined partly by a sledge assembly 20 comprising a plurality of transversely extending rollers 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rollers 21, 22, 23 are driven in a counter-clockwise direction by conventional means (for example, chains and sprockets) coupled to a drive shaft 28. A starter roll 30, located adjacent roller 23, is also driven counter-clockwise.

A freely rotatable follower roller 31, carried by arms 24, moves in an arcuate path with sledge assembly 20 and is provided with bearings that permit it to freely rotate about a transverse axis extending between the ends of arms 24. Also mounted on arms 24 is a baffle assembly, generally designated by reference numeral 29. The key structure of the preferred embodiment of the present invention is embodied in assembly 29 and will be described in further detail hereinbelow with specific reference to FIGS. 5–9.

Figure 2:
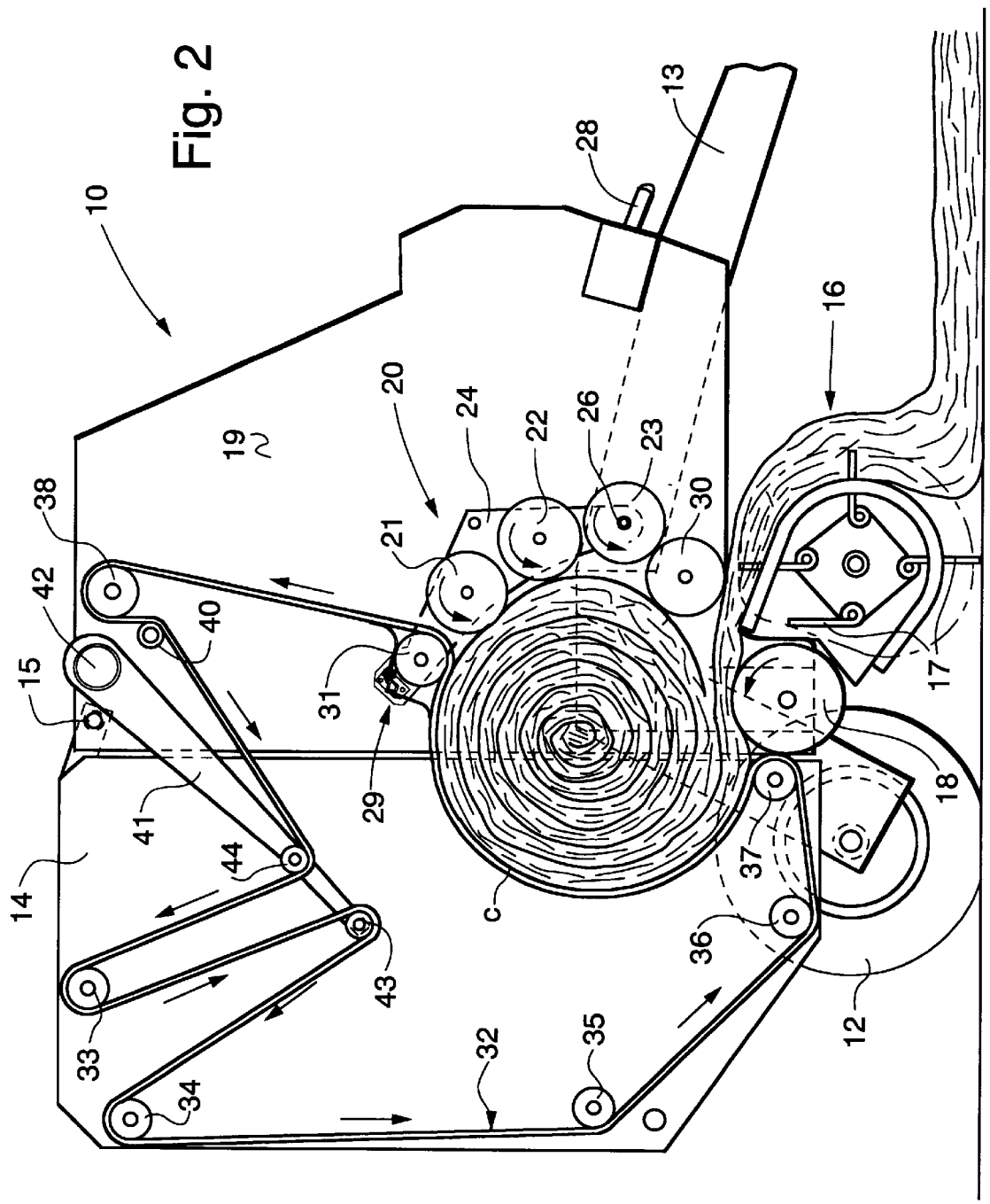
FIG. 2 is similar to FIG. 1 with the bale forming chamber in its partly full position.
Figure 3:
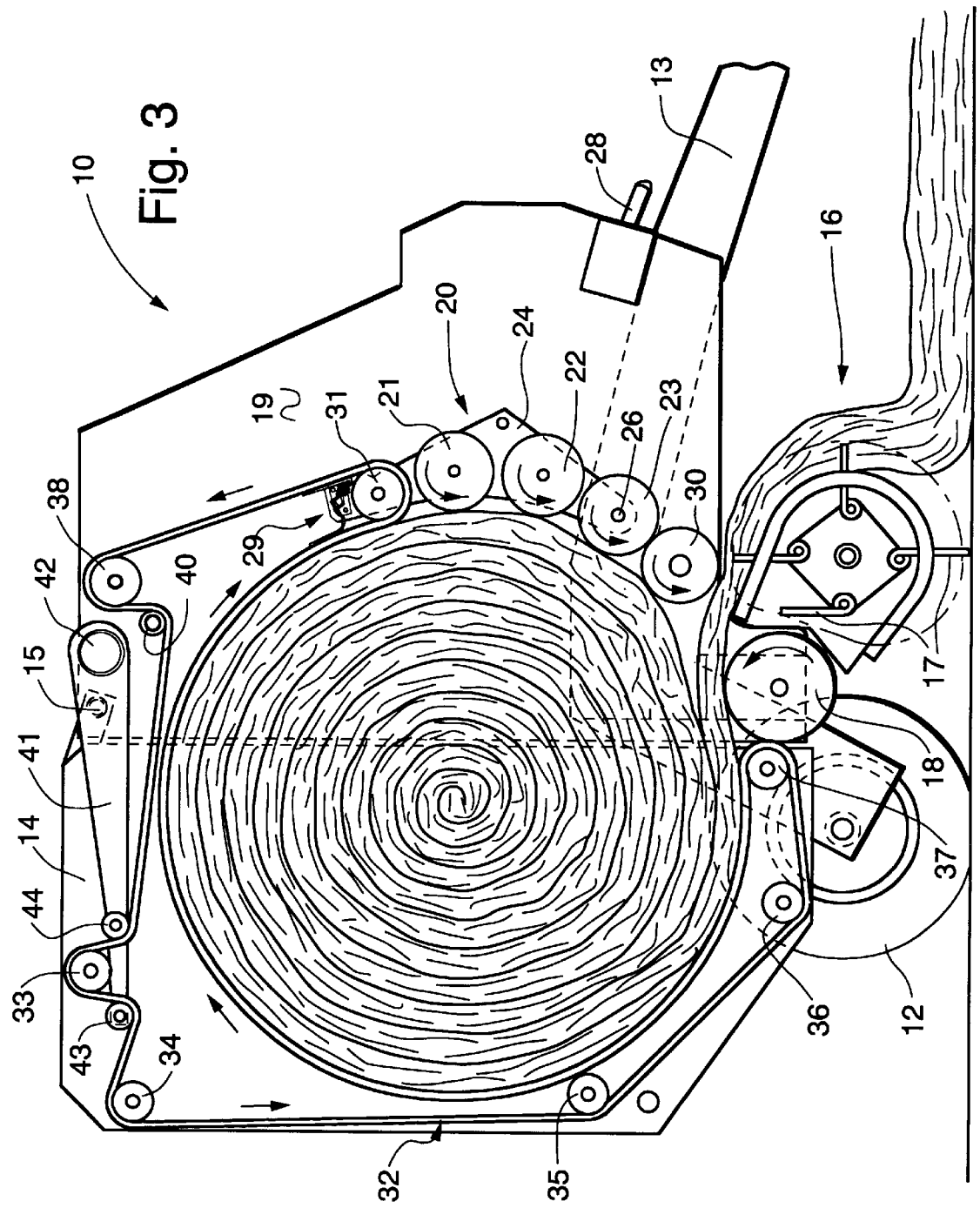
FIG. 3 is also similar to FIGS. 1 and 2 with the bale forming chamber in its full bale position.
Figure 4:
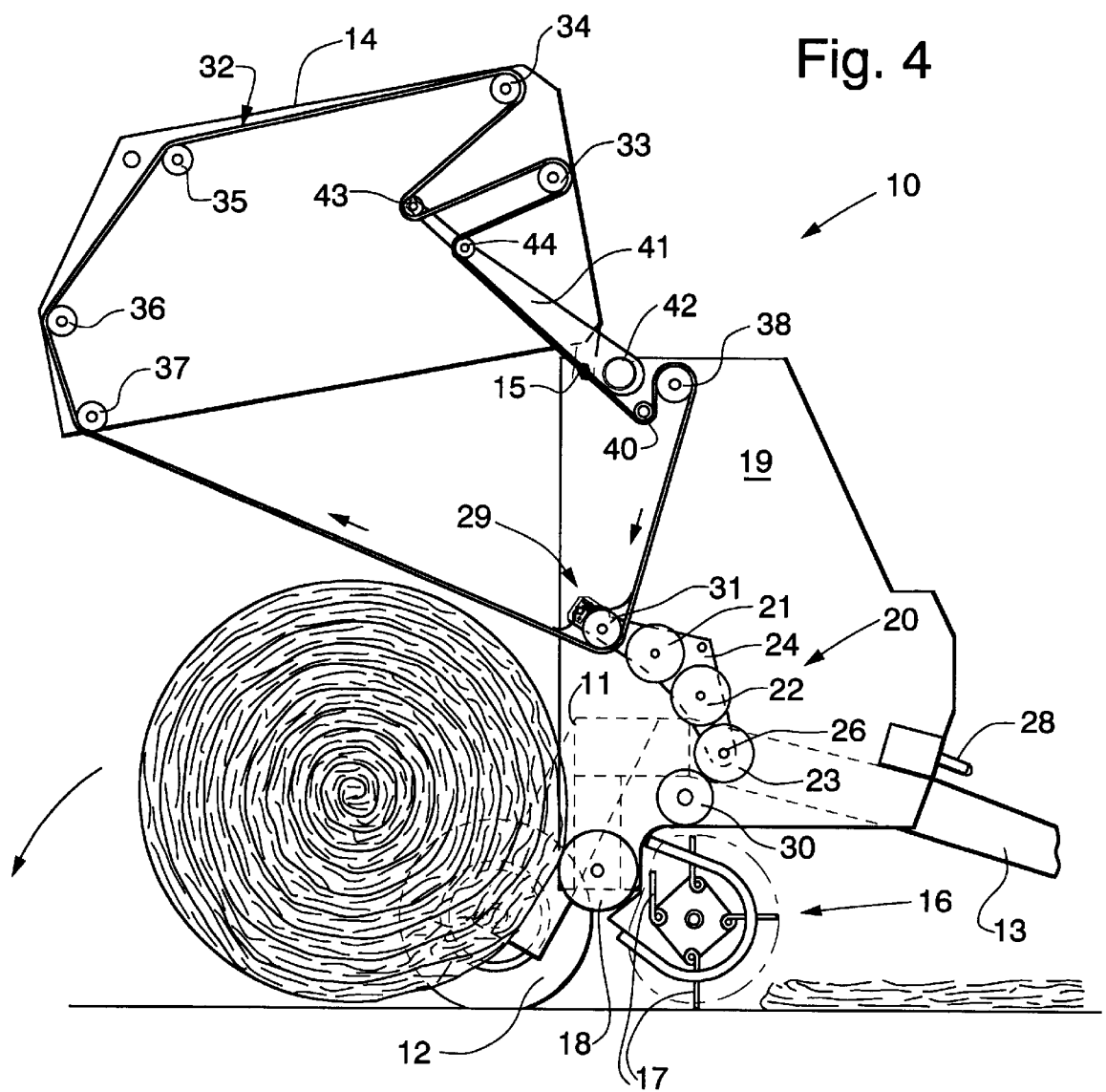
FIG. 4 is also similar to FIGS. 1–3 with the baler elements shown in the bale discharge condition.

Returning to the round baler structure generally depicted in FIGS. 1–4, bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 and follower roller 31, it is in engagement only with follower roller 31, which as mentioned above is an idler roller. Thus, roller 21 serves to strip crop material from the belts, in addition to its bale forming function. Suitable coupling means (not shown) connected to drive shaft 28 provide rotation of drive roll 38 causing movement of apron 32 along its varying paths in the directions indicated by the plurality of direction arrows in FIGS. 1, 2 and 3. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner, intermediate and outer positions shown in FIGS. 1, 2 and 3, respectively. Take up arms 41, which carry additional guide rolls 43, 44 for supporting apron 32, are urged toward their inner positions (FIG. 1), by conventional means, e.g., springs and thereby return to that inner position when the bale is discharged, as shown in FIG. 4.

When the elements of round baler 10 are disposed in the bale starting position shown in FIG. 1, an inner course c of apron 32 extends between guide roll 37 and idler roll 31 to form the rear wall of the core starting chamber while the inwardly facing peripheral surfaces of rollers 21, 22, 23 define in a general manner a rearwardly inclined cooperating front wall. Floor roll 18 defines the bottom of the chamber and with starter roller 30 provides an inlet for crop material.

As round baler 10 travels across a field on which crop material has been deposited in windrows, pickup tines 17 lift crop material from the ground and deliver it through the inlet. The crop material is carried rearwardly by floor roll 18 into engagement with apron inner course c (FIG. 1) which urges it upwardly and forwardly into engagement with the rollers on sledge 20. In this manner crop material is coiled in a clockwise direction to start a bale core. Continued feeding of crop material into the bale forming chamber by pickup tines 17 causes the apron inner course c to expand in length around a portion of the circumference of the bale core as the diameter increases (FIG. 2). Take up arms 41 rotate from their inner positions shown in FIG. 1 toward their outer positions shown in FIG. 3 to provide for expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly as shown in FIG. 4. It should be noted that the directional arrows of apron 32 in FIG. 4 are in the reverse of the direction of the arrows in FIGS. 1–3, the reason for which will be discussed below. Subsequent closing of tailgate 14 returns the inner and outer courses of the belts of apron 32 to the locations shown in FIG. 1.

During bale formation, sledge assembly 20 moves between a bale starting position (FIG. 1) to a full bale position (FIG. 3). This movement of sledge assembly 20 causes follower roller 31 to move in an arcuate path while maintaining apron 32 in close proximity to roller 21, thereby allowing roller 21 to strip crop material from the belts and prevent or reduce significantly the loss of crop material from the chamber via the space between roller 21 and apron 32 during formation of a bale. Sledge assembly 20 is pushed outwardly towards its full bale position during bale formation as the crop material expands against rollers 21, 22, 23 and then subsequently is pulled inwardly by apron 32 to the position shown in FIG. 1.

With the above description and general operation of baler 10 as a background, attention is now directed to FIGS. 5–8 in which baffle assembly 29 mounted on sledge 20, is shown in positions corresponding to the positions of baler 10 in FIGS. 1–4, respectively. Initially, it should be pointed out that baffle 50 and scraper 51 are well known expedients in the prior art for preventing trash buildup during bale formation. Baffle 50, comprising a flexible material such as tire carcass, is secured to a channel member 52 by a series of bolts 53, cap screws, or the like (also see FIG.9). Member 52 is welded to a bracket 54, which is affixed to sledge arms 24 by bolts 55. Completing the weld assembly is rectangular cross member 56 to which scraper 51 is attached by a series of bolts 57, or the like. Also included in baffle assembly 29 is unique auxiliary baffle 58 secured to cross member 56 with scraper 51 by bolts 57. The important function of auxiliary baffle 58 will become apparent during the sequential explanation of the relationship of the elements of the baffle assembly during operation. Auxiliary baffle 58 is also fabricated from a flexible, resilient material such as tire carcass, or the like.

Figure 5:
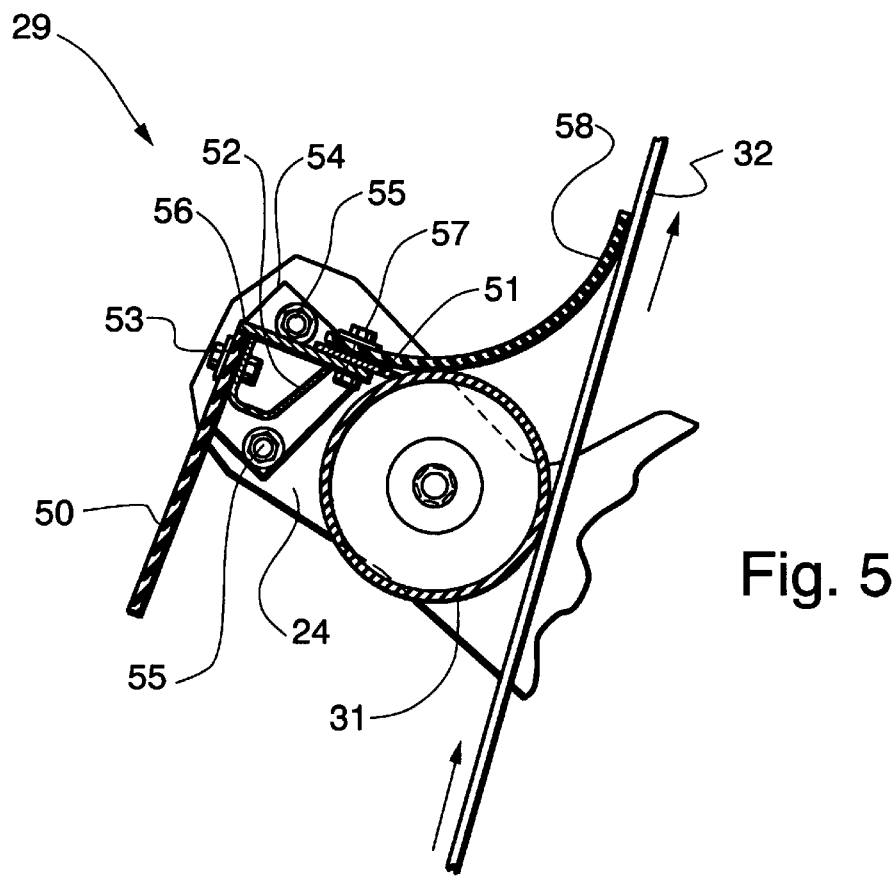
FIG. 5 is an enlarged view of the structure shown within circle 5 in FIG. 1.

In operation, as mentioned above crop material is picked up by pickup 16 and conveyed by tines 17 to floor roll 18 which urges it against upwardly traveling course c of apron 32. When the bale forming chamber is empty (FIG. 1) the condition of the elements of baffle assembly 29 is shown in FIG. 5, i.e., baffle 50 is free to hang downwardly while auxiliary baffle 58 contacts the inner surface of the belts 60 (FIG. 9) of apron 32, which are being driven in the direction shown by the direction arrows. At this point there is obviously no unwanted debris with which to contend.

Figure 6:
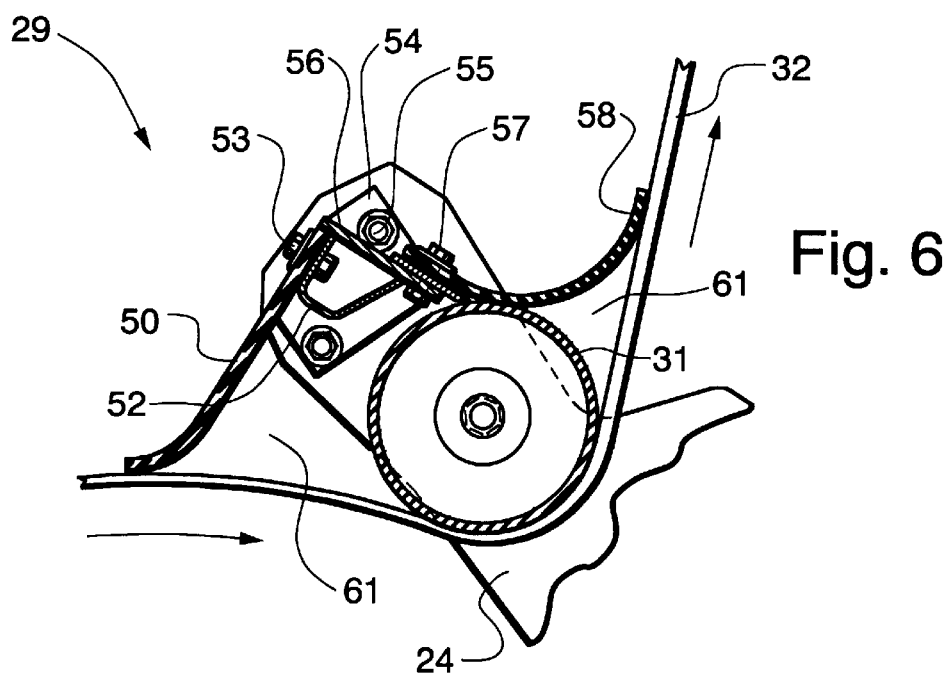
FIG. 6 is an enlarged view similar to FIG. 5 with the elements shown in the condition corresponding to the partly full position of the bale forming chamber.

As the bale forming process continues, crop material begins to spiral in a clockwise direction in a well known manner until it engages the rollers of sledge assembly 20 which continues to roll it in a spiral fashion causing course c to expand through the position shown in FIG. 2. During this part of the bale forming operation, the condition of the elements of baffle assembly 29 is shown in FIG. 6, i.e., baffle 50 is now in contact with belts 60 of apron 32 and begins to serve its principle function of preventing the buildup of debris in area 61 which, as mentioned above, is a known expedient. At this point during bale formation auxiliary baffle 58 continues to contact the inner surface of the belts 60 of apron 32, which are being driven in the direction shown by the direction arrows. There is no need to shield area 61 from unwanted debris in light of the direction of belts 60, i.e., any debris would be carried away from follower roll 31.

Figure 7:
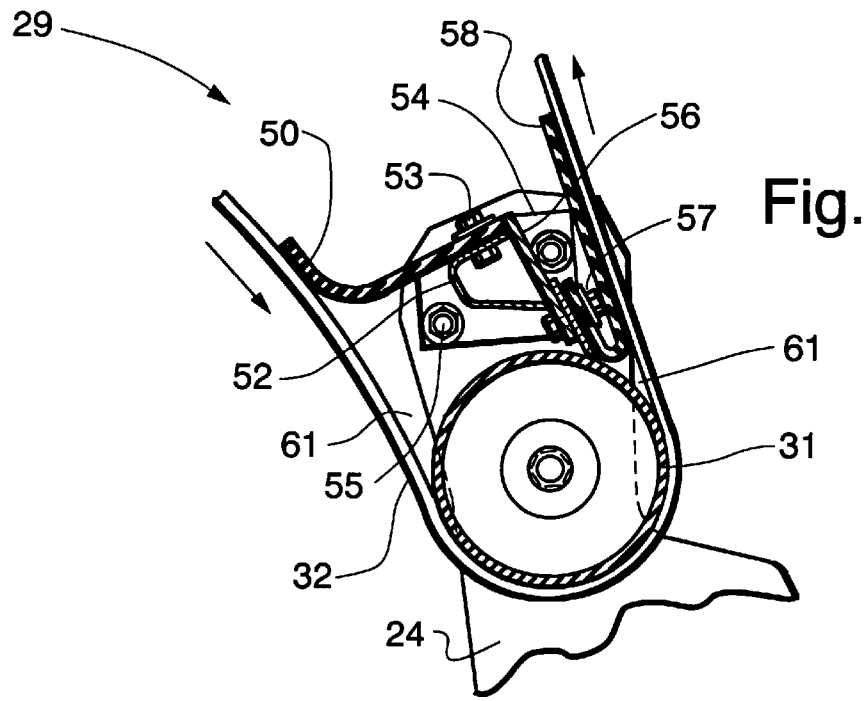
FIG. 7 is an enlarged view similar to FIG. 5 with the elements shown in the condition corresponding to the full bale position of the bale forming chamber.

The bale forming process continues until the baler reaches the full bale position shown in FIG. 3, whereupon the crop material, which has been formed into a cylindrical package, continue to spiral in a clockwise direction until wrapping is completed in a well known manner. During this portion of the bale forming operation, the condition of the elements of baffle assembly 29 is shown in FIG. 7, i.e., baffle 50 is still in contact with belts 60 of apron 32 and continues to serve its principle function of preventing the buildup of debris in area 61. At this point auxiliary baffle 58 continues to contact the inner surface of the belts 60 of apron 32, which are being driven in the direction shown by the direction arrows. There still is no need to shield area 61 from unwanted debris in light of the direction of belts 60. The flexibility of baffle 58 permits it to be maintained in a generally J shaped configuration.

Figure 8:
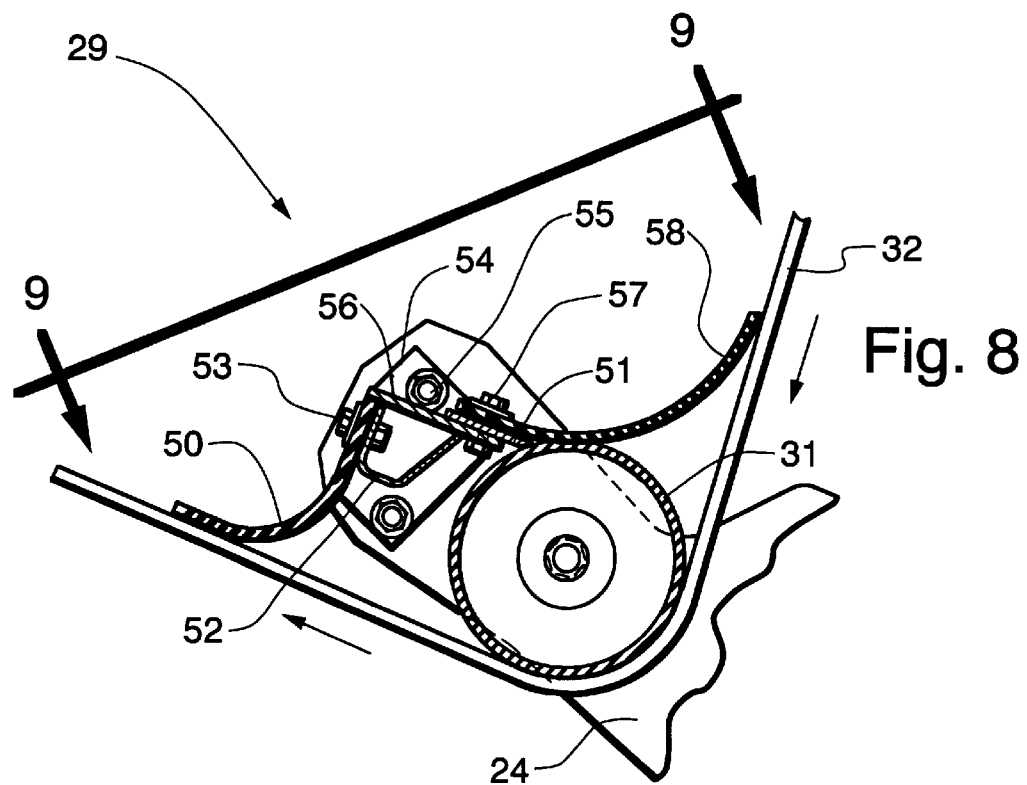
FIG. 8 is an enlarged view similar to FIG. 5 with the elements shown in the condition corresponding to the bale discharge position of the baler.
Figure 9:
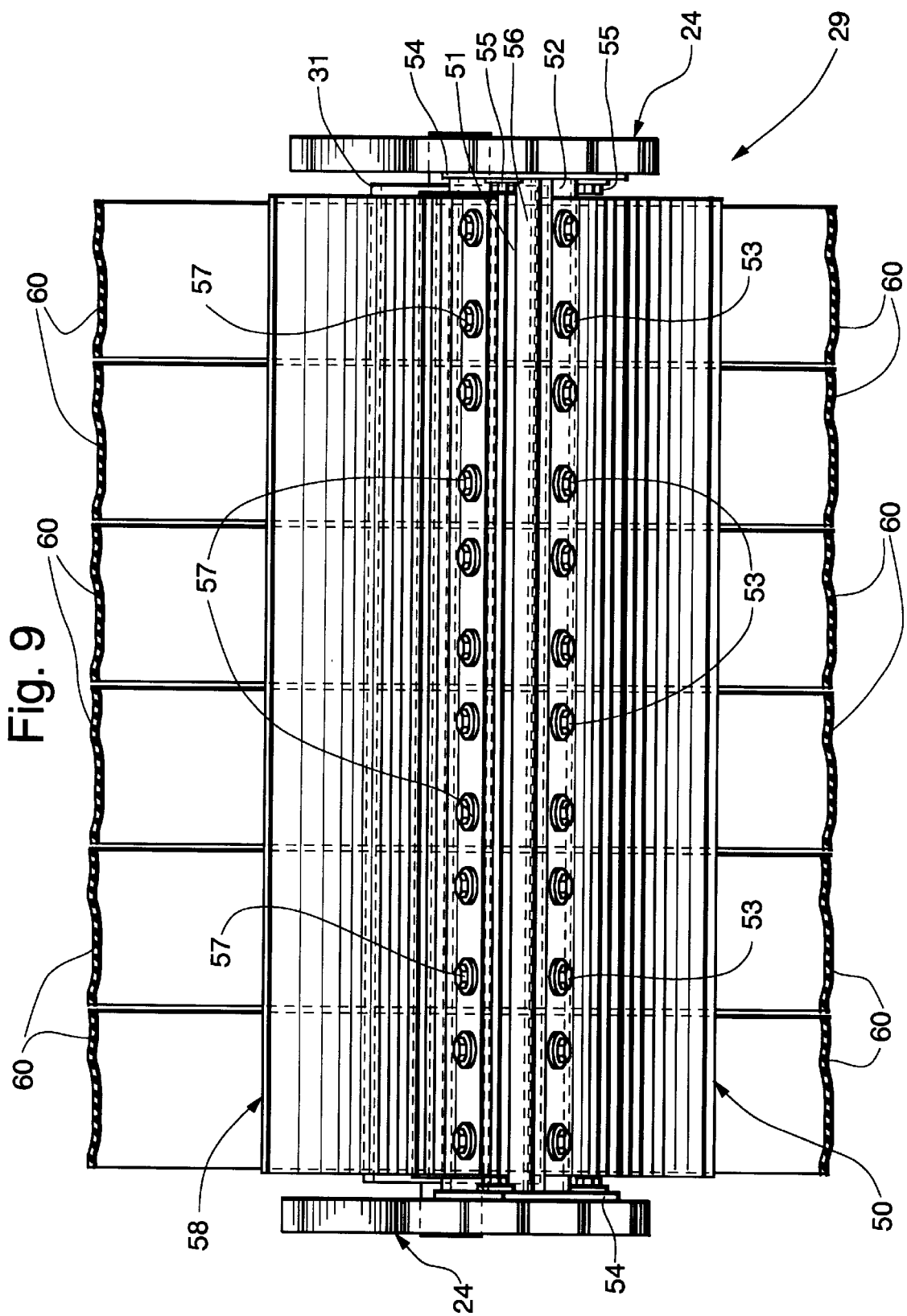
FIG. 9 is a view taken in the direction of arrows 9—9 in FIG. 8.

Now turning to FIG. 8, it should be noted that in this condition the belts are no longer in contact with the outer surface of the bale (see FIG. 4) and are now moving for a short period of time in the opposite direction. This is caused by friction on the surface of the bale at the time the belt drive is declutched while the bale is being discharged and it is not clear of the belts as shown in FIG. 8. Declutching allows the belts to move freely with the surface of the bale as it is being discharged. This reversed direction can also take place even if the drive is not declutched, by virtue of the geometry of the belt path, i.e., when the take up is released to return to its initial position, slack causes an initial reverse surge of the belts. Regardless of the reason, reverse motion of the belts (FIG. 8) tends to draw unwanted debris back toward follower roll and into area 61, but build up of such debris being urged toward area 61 is prevented by auxiliary baffle 58, resulting in new and improved results. Thus, follower roller 31 is shielded from trash accumulation between belts 60 of apron 32, regardless of the direction of travel of the belts.

Of the many implicit and explicit advantages of the present invention, one of the most important is the prevention of damage to the chain that limits travel of the sledge. By preventing build up of debris between the follower roll and the belts, the sledge is permitted to smoothly return to the core starting position.

While preferred structure incorporating principles of the present invention is shown and described above, it is to be understood that the invention is not limited to such structure, but that, in fact, widely different means of varying scope and configuration may be employed in the practice of the invention.

Having thus described the invention, what is claimed is:

1. A round baler for forming crop material into cylindrical bales, said baler comprising a main frame, a tailgate pivotally connected to said main frame, a sledge assembly mounted on said main frame for movement between a bale starting position and a full bale position, said sledge assembly comprising conveying means having a crop engaging surface extending transversely of said main frame, an apron comprising a plurality of side-by-side belts movably supported along a continuous path on said main frame and on said tailgate, said apron path having an inner course at which one surface of said plurality of side-by-side belts cooperates with said conveying means on said sledge assembly to define a bale forming chamber, and a pickup for feeding crop material into said bale forming chamber, said sledge assembly further comprising a follower roller extending transversely of said main frame for operative engagement with the other surface of said side-by-side belts, the improvement comprising baffle means mounted on said sledge assembly, said baffle means comprise a trash baffle disposed contiguous to said other surface of said side-by-side belts for shielding said follower roll from stray crop material and other debris under conditions where said apron is moving in a direction opposite to the bale forming direction.

2. In a round baler as set forth in claim 1 wherein said sledge assembly includes a pair of opposing arms pivotally mounted on said main frame, means for pivoting said arms in concert about an axis extending transversely at one end of said opposing arms, and means for mounting said baffle means at the other end of said opposing arms.

3. In a round baler as set forth in claim 2 wherein said tailgate is operative between a closed position during bale formation and an open position for discharging a bale formed in said bale forming chamber.

4. In a round baler as set forth in claim 3 wherein said apron, under conditions where said tailgate is in said open position, moves in a direction opposite to the direction of motion during bale forming.

5. In a round baler as set forth in claim 4 wherein said baffle means further comprises a second trash baffle for shielding said follower roll from stray crop material and other debris under conditions where said apron is moving in said direction of motion during bale forming.

6. In a round baler as set forth in claim 1 wherein said trash baffle comprises a rectangularly shaped flexible strip of resilient material with an edge extending in a generally vertical orientation under conditions where said bale forming chamber is empty.

7. In a round baler as set forth in claim 6 wherein said flexibility of said trash baffle permits it to be transformed to a general arcuate shape under conditions where its outer edge portion is engaged by said other surface of said side-by-side belts.

8. A round baler for forming crop material into cylindrical bales, said baler comprising a main frame, a tailgate pivotally connected to said main frame, a bale forming assembly mounted on said main frame for movement between a bale starting position and a full bale position, said bale forming assembly comprising conveying means having a crop engaging surface extending transversely of said main frame, an apron comprising a plurality of side-by-side belts movably supported along a continuous path on said main frame and on said tailgate, said apron path having an inner course whereat one surface of a plurality of side-by-side belts cooperates with said conveying means on said bale forming assembly to define a bale forming chamber, and a pickup for feeding crop material into said bale forming chamber, said bale forming assembly further comprising a roller extending transversely of said main frame for operative engagement with the other surface of said side-by-side belts, the improvement comprising baffle means mounted on said bale forming assembly, said baffle means comprise a trash baffle disposed contiguous to said other surface of said side-by-side belts for shielding said roll from stray crop material and other debris under conditions where said apron is moving in a direction opposite to the bale forming direction.

9. In a round baler as set forth in claim 8 wherein said tailgate is operative between a closed position during bale formation and an open position for discharging a bale formed in said bale forming chamber.

10. In a round baler as set forth in claim 9 wherein said apron, under conditions where said tailgate is in said open position, moves in a direction opposite to the direction of motion during bale forming.

11. In a round baler as set forth in claim 10 wherein said baffle means further comprises a second trash baffle for shielding said roll from stray crop material and other debris under conditions where said apron is moving in said direction of motion during bale forming.

12. In a round baler as set forth in claim 8 wherein said trash baffle comprises a rectangularly shaped flexible strip of resilient material with an edge extending in a generally vertical orientation under conditions where said bale forming chamber is empty.

13. In a round baler as set forth in claim 12 wherein said flexibility of said trash baffle permits it to be transformed to a general arcuate shape under conditions where its outer edge portion is engaged by said other surface of said side-by-side belts.

\* \* \* \* \*